(12) United States Patent
Hasegawa et al.

(10) Patent No.: US 7,279,870 B2
(45) Date of Patent: Oct. 9, 2007

(54) DC-DC CONVERTER AND METHOD OF CONTROLLING DC-DC CONVERTER

(75) Inventors: Morihito Hasegawa, Kasugai (JP); Hidekiyo Ozawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 11/342,553

(22) Filed: Jan. 31, 2006

(65) Prior Publication Data

US 2007/0090819 A1    Apr. 26, 2007

(30) Foreign Application Priority Data

Oct. 25, 2005    (JP)    ............... 2005-310378

(51) Int. Cl.
    *G05F 1/613*    (2006.01)
(52) U.S. Cl. ..................... 323/224; 323/285
(58) Field of Classification Search ............. 323/224, 323/283, 288, 285
    See application file for complete search history.

(56) References Cited

U.S. PATENT DOCUMENTS 7,119,522 B1 * 10/2006 Tomiyoshi ............... 323/224

FOREIGN PATENT DOCUMENTS

| JP | 05-304771 | 11/1993 |
|---|---|---|
| JP | 11-187647 | 7/1999 |
| JP | 2002-112535 | 4/2002 |
| JP | 2002-374131 A | 12/2002 |
| JP | 2003-219638 A | 7/2003 |
| JP | 2004-040859 A | 2/2004 |

* cited by examiner

Primary Examiner—Shawn Riley
(74) Attorney, Agent, or Firm—Arent Fox LLP

(57) ABSTRACT

A DC-DC converter applicable to a wide input voltage range. An error amplifier compares a divided voltage, which is generated by dividing output voltage with a plurality of resistors, and a reference voltage to generate an error signal. A voltage source generates an offset signal by offsetting the error signal. A PWM comparator compares the offset signal with a triangular wave signal to generate a drive signal for controlling activation and inactivation of a first output transistor and a second transistor at a duty corresponding to the comparison result. An offset controller determines the ratio between the output voltage and the input voltage and controls the offset voltage of the voltage source in accordance with the determination.

7 Claims, 9 Drawing Sheets

DC-DC CONVERTER AND METHOD OF CONTROLLING DC-DC CONVERTER

CROSS-REFERENCE TO RELATED APPLICATIONS

This application is based upon and claims the benefit of priority from prior Japanese Patent Application No. 2005-310378, filed on Oct. 25, 2005, the entire contents of which are incorporated herein by reference.

BACKGROUND OF THE INVENTION

The present invention relates to a DC-DC converter and a method for controlling a DC-DC converter.

A battery is installed as a driving power source in many portable electronic devices. Due to battery discharge, the output voltage of a battery decreases during use of an electronic device. A direct current voltage conversion circuit (DC-DC converter) for converting the output voltage of the battery to voltage having a constant value is arranged in the electronic device. When the electronic device incorporates a chargeable battery, or a secondary battery, the battery is charged by the power supplied from an AC adapter connected to the electronic device. The power supplied from the AC adapter is also used to operate the electronic device. Therefore, the DC-DC converter is supplied with power from both the battery and the AC adapter. The voltage supplied from the battery to the DC-DC converter differs from the voltage supplied from the AC adapter to the DC-DC converter. Thus, it is required that a DC-DC converter be stably operable over a wide input voltage range.

Referring to FIG. 1, a conventional DC-DC converter 10 is of a voltage control mode type DC-DC converter. A control unit 11 is a step-down type switching regulator for controlling the activation and inactivation of output transistors T1 and T2 to supply a load circuit (not shown) with output voltage Vout obtained by lowering input voltage Vin.

The output transistors T1 and T2 are N-channel MOS transistors. The output transistor T1 includes a drain supplied with the input voltage Vin and a source connected to the drain of the output transistor T2. The source of the output transistor T2 is grounded. A drive signal DH is provided to the gate of the output transistor T1 from the control unit 11, and a drive signal DL is provided to the gate of the output transistor T2 from the control unit 11. A first terminal of a choke coil L1 is connected to a node between the output transistors T1 and T2, and a second terminal of the choke coil L1 is connected to a smoothing capacitor C1. The second terminal of the choke coil L1 is also connected to the load circuit.

A feedback signal FB having the voltage at the load side terminal of the choke coil L1, that is, the output voltage Vout, is provided to the control unit 11. An input resistor R1 and a ground resistor R2 divide the voltage of the feed back signal FB and generate divided voltage V1. The divided voltage V1 is provided to an inverting input terminal of an error amplifier 12. Reference voltage Vr of a reference power supply e1 is supplied to a non-inverting input terminal of the error amplifier 12. A feedback capacitor C2 and a feedback resistor R3 are connected in series between the output terminal and inverting input terminal of the error amplifier 12 to prevent oscillation of the error amplifier 12. The error amplifier 12 amplifies the voltage difference between the divided voltage V1 and the reference voltage Vr and generates an error signal Vop having the amplified voltage.

The error signal Vop is provided to a non-inverting input terminal of a PWM comparator 13. A triangular wave signal SS having a constant frequency is provided from a triangular wave signal oscillator 14 to an inverting input terminal of the PWM comparator 13. The PWM comparator 13 outputs the drive signal DH with an H level and the drive signal DL with an L level when the voltage of the error signal Vop is higher than the voltage of the triangular wave signal SS. Further, the PWM comparator 13 outputs the drive signal DH with an L level and the drive signal DL with an H level when the voltage of the error signal Vop is lower than the voltage of the triangular wave signal SS. The drive signal DH and the drive signal DL are provided to the gates of the output transistors T1 and T2, respectively. The output transistor T1 is driven (activated and inactivated) in response to the drive signal DH. The output transistor T2 is driven (activated and inactivated) in response to the drive signal DL.

When the output transistor T1 is activated in response to the drive signal DH with an H level and the output transistor T2 is inactivated in response to the drive signal DL with an L level, the output voltage Vout of the DC-DC converter 10 increases. The output voltage Vout is smoothed by the smoothing capacitor C1. The energy stored in the choke coil L1 is released when the output transistor T1 is inactivated in response to the drive signal DH with an L level. The output voltage Vout decreases as the energy stored in the choke coil L1 decreases. When the divided voltage V1 becomes lower than the reference voltage Vr due to the decrease of the output voltage Vout, the drive signal DH with an H level is output to activate the output transistor T1.

As shown in FIG. 2, when the output voltage Vout becomes low, the voltage of the error signal Vop increases, and the pulse width of the drive signal DH of H level increases. Further, the activation time of the output transistor T1 becomes long. When the output voltage Vout becomes high, the voltage of the error signal Vop decreases and the pulse width of the drive signal DH of H level decreases. Further, the activation time of the output transistor T1 becomes short. Such operations control the two output transistors T1 and T2 so that the divided voltage V1 and the reference voltage Vr become the same to keep the output voltage Vout constant.

In the conventional DC-DC converter 10, the input resistor R1, the ground resistor R2, the feedback resistor R3 and the feedback capacitor C2 determine the gain of the error amplifier 12. The gain of the error amplifier 12 is set so that the voltage of the error signal Vop is within the amplitude range of the triangular wave signal SS. For instance, when the minimum voltage and the maximum voltage of the triangular signal SS are respectively 1 V and 2 V, the voltage of the error signal Vop must be a value within the amplitude range of the triangular wave signal SS, that is, between the maximum voltage and the minimum voltage. The output voltage Vout becomes unstable if the voltage of the error signal Vop is outside the amplitude range of the triangular wave signal SS.

A technique for controlling the gain of the error amplifier based on the output voltage Vout has been proposed (Japanese Laid-Open Patent Publication No. 05-304771, Japanese Laid-Open Patent Publication No. 11-187647, and Japanese Laid-Open Patent Publication No. 2002-112535).

SUMMARY OF THE INVENTION

The output voltage Vout of the DC-DC converter 10 is determined by the input voltage Vin and the ratio between the activation time Ton and inactivation time Toff (so-called ON duty of the output transistor T1) of the output transistor T1. That is, the output voltage Vout is expressed by the following equation.

$$Vout=Ton/(Ton+Toff) \times Vin=Ton/T \times Vin$$

T represents the cycle (Ton+Toff) in which the output transistor T1 is activated. The ratio between the input voltage Vin and the output voltage Vout is expressed by the following equation.

$$Vout/Vin=Ton/T$$

The ON duty of the output transistor T1 is determined by the voltage of the triangular wave signal SS and the voltage of the error signal Vop. The voltage of the triangular wave signal SS and the voltage of the error signal Vop must relatively changed the ratio between the input voltage V and the output voltage Vout.

For instance, when the output voltage Vout is 1.0 V, the input voltage Vin is two times greater than (2.0 V) the output voltage Vout, and the minimum value and the maximum value of the triangular wave signal SS are 1 V and 2 V, respectively. Further, the ON duty of the output transistor T1 is 50%, and the voltage of the error signal Vop must be 1.5 V, which is the median value of the amplitude of the triangular wave signal SS. If the input voltage Vin is three times greater than (3.0 V) the output voltage Vout, for example, the ON duty of the output transistor is approximately 33%, and the voltage of the error signal Vop must be approximately 1.33 V. If the input voltage Vin is four times greater than (4.0 V) the output voltage Vout, for example, the ON duty of the output transistor is 25%, and the voltage of the error signal Vop must be 1.25 V. FIG. 3 shows the input voltage Vin and the voltage of the error signal Vop used to obtain the output voltage Vout of 1 V.

Due to the difference between the input voltage Vin and the output voltage Vout, the ON duty ratio of the output transistor T1 must be changed. In the method disclosed in the above prior art publications, the amplification factor of the voltage difference between the reference voltage Vr and the divided voltage V1 in the error amplifier 12 shown in FIG. 2 is changed. This merely changes the response of the switching operation of the DC-DC converter. That is, when the output voltage Vout is 1.0 V in the example of FIG. 3, the ON duty of the output transistor T1 is 50% even if the gain of the error amplifier is changed. A change in the gain of the error amplifier means a change in the ON duty of the output transistor T1. For instance, when the output voltage Vout is 1.1 V, the ON duty of the output transistor T1 is changed from 40% to 30%.

Therefore, in the prior art, when the DC-DC converter is installed in devices having different input voltages Vin, the DC-DC converter must be applicable to the different input voltages Vin and output voltage Vout of each device. Further, it is troublesome to determine the resistance value of each resistor R1 to R3 and the capacitance value of the feedback capacitor C2 in accordance with the input voltage Vin and the output voltage Vout.

One aspect of the present invention is a DC-DC converter for converting an input voltage to an output voltage. The DC-DC converter includes a first output transistor for receiving the input voltage. A second output transistor is connected in series to the first output transistor. A control unit generates a drive signal that controls activation and inactivation of the first output transistor and the second transistor and provides the first output transistor and the second transistor with the drive signal. The control unit changes duty of the drive signal in accordance with the output voltage. The control unit includes a plurality of resistors for generating a divided voltage from the output voltage. An error amplifier compares the divided voltage with a reference voltage to generate an error signal. An offset circuit changes voltage of the error signal by an offset voltage that is in accordance with a control signal to generate an offset signal. A PWM comparator compares the offset signal with a triangular wave signal and generates the drive signal to have a duty that is in accordance with the comparison result. An offset controller, connected to the offset circuit, compares the output voltage and the input voltage and generating the control signal in accordance with the comparison result.

Another aspect of the present invention is a DC-DC converter for converting an input voltage to an output voltage. The DC-DC converter includes a first output transistor for receiving the input voltage. A second output transistor is connected in series to the first output transistor. A control unit generates a drive signal that controls activation and inactivation of the first output transistor and the second transistor and provides the first output transistor and the second transistor with the drive signal. The control unit changes duty of the drive signal in accordance with the output voltage. The control unit includes a plurality of resistors for generating a divided voltage from the output voltage. An error amplifier compares the divided voltage with a reference voltage to generate an error signal. An offset circuit changes a triangular wave signal by an offset voltage that is in accordance with a control signal to generate an offset signal. A PWM comparator compares the error signal with the offset signal and generates the drive signal to have a duty that is in accordance with the comparison result. An offset controller, connected to the offset circuit, compares the output voltage and the input voltage and generates the control signal in accordance with the comparison result.

A further aspect of the present invention is a control unit for use in a DC-DC converter for converting an input voltage to an output voltage in which the control unit is for controlling the output voltage. The DC-DC converter includes a first output transistor and a second output transistor that are connected in series. The control unit includes a plurality of resistors for generating a divided voltage from the output voltage. A plurality of resistors generate a divided voltage from the output voltage. An error amplifier compares the divided voltage with a reference voltage to generate an error signal. An offset circuit changes voltage of the error signal by an offset voltage that is in accordance with a control signal to generate an offset signal. A PWM comparator compares the offset signal with a triangular wave signal and generates the drive signal to have a duty that is in accordance with the comparison result. An offset controller, connected to the offset circuit, compares the output voltage and the input voltage and generates the control signal in accordance with the comparison result.

Another aspect of the present invention is a control unit for use in a DC-DC converter for converting an input voltage to an output voltage in which the control unit is for controlling the output voltage. The DC-DC converter includes a first output transistor and a second output transistor that are connected in series. The control unit includes a plurality of resistors for generating a divided voltage from the output voltage. An error amplifier compares the divided voltage with a reference voltage to generate an error signal. An offset circuit for changing a triangular wave signal by an offset voltage that is in accordance with a control signal to generate an offset signal. A PWM comparator compares the error signal with the offset signal and generates the drive signal to have a duty that is in accordance with the comparison result. An offset controller, connected to the offset circuit, compares the output voltage and the input voltage and generates the control signal in accordance with the comparison result.

A further aspect of the present invention is a method for controlling a DC-DC converter for converting an input voltage to an output voltage. The DC-DC converter includes a first output transistor for receiving the input voltage and a second output transistor connected in series to the first output transistor. The method includes generating a divided voltage from the output voltage with a plurality of resistors, comparing the divided voltage with a reference voltage to generate an error signal with an error amplifier, comparing the output voltage and the input voltage and generating a control signal in accordance with the comparison result with an offset controller, changing voltage of the error signal by an offset voltage that is in accordance with the control signal to generate an offset signal with an offset circuit, comparing the offset signal with a triangular wave signal, generating the drive signal to have a duty that is in accordance with the comparison result, and providing the drive signal to the first and second output transistors with a PWM comparator.

Another aspect of the present invention is a method for controlling a DC-DC converter for converting an input voltage to an output voltage. The DC-DC converter includes a first output transistor for receiving the input voltage and a second output transistor connected in series to the first output transistor. The method includes generating a divided voltage from the output voltage with a plurality of resistors, comparing the divided voltage with a reference voltage to generate an error signal with an error amplifier, comparing the output voltage and the input voltage and generating a control signal in accordance with the comparison result with an offset controller, changing a triangular wave signal by an offset voltage that is in accordance with the control signal to generate an offset signal with an offset circuit, comparing the error signal with the offset signal, generating the drive signal to have a duty that is in accordance with the comparison result, and providing the drive signal to the first and second output transistors with a PWM comparator.

A further aspect of the present invention is a DC-DC converter for converting an input voltage to an output voltage. The DC-DC converter includes a first output transistor for receiving the input voltage. A second output transistor is connected in series to the first output transistor. An offset controller compares the input voltage with the actual output voltage and generates a control signal for adjusting the actual output voltage in accordance with the comparison result to a desired output voltage. A PWM comparator provides the first output transistor and the second output transistor with a first drive signal and a second drive signal for driving the first and second output transistors, respectively. The drive signals each have a duty corrected in accordance with the control signal.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A DC-DC converter according to a first embodiment of the present invention will now be discussed.

Figure 1:
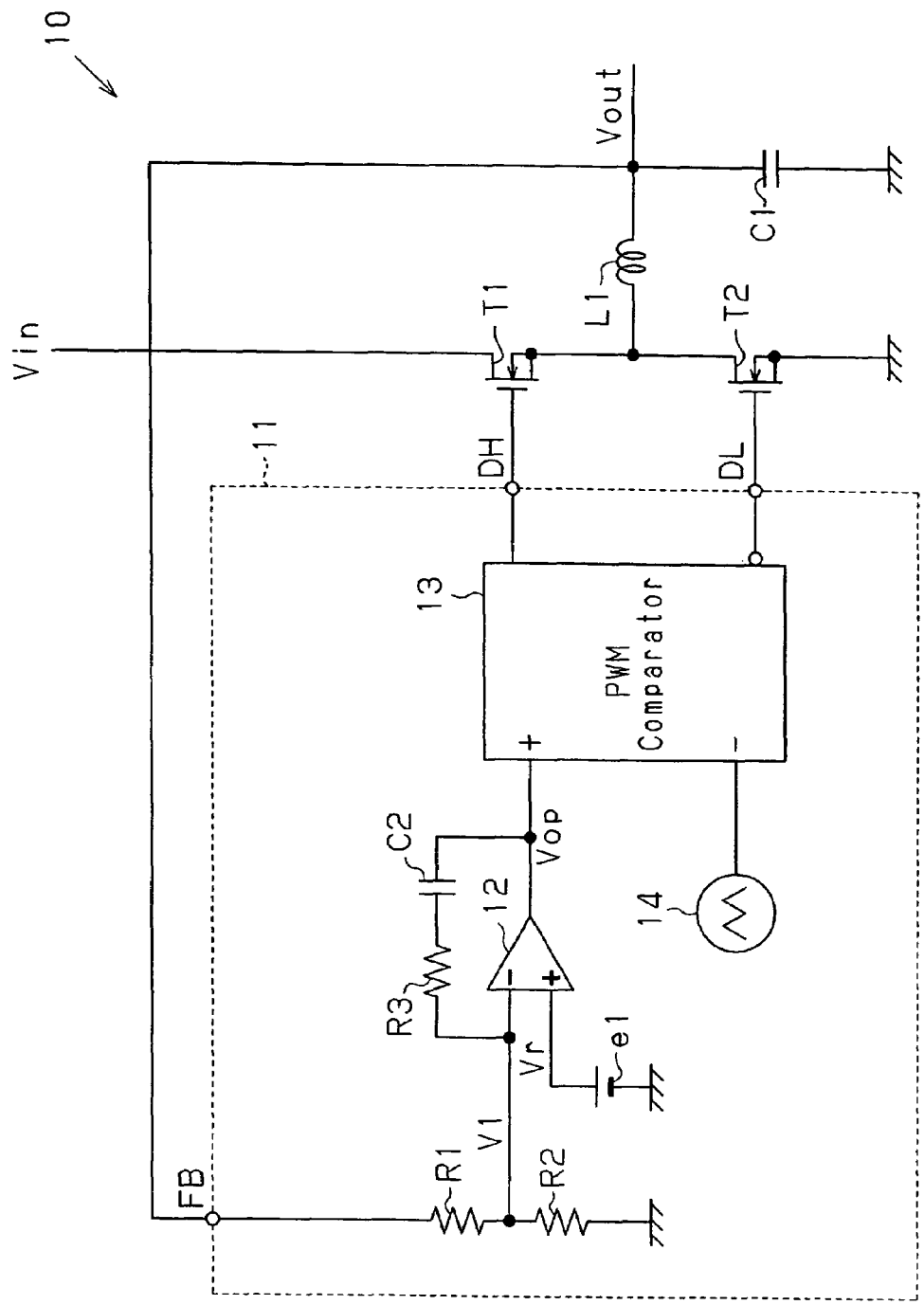
FIG. 1 is a block diagram of a conventional DC-DC converter.
Figure 2:
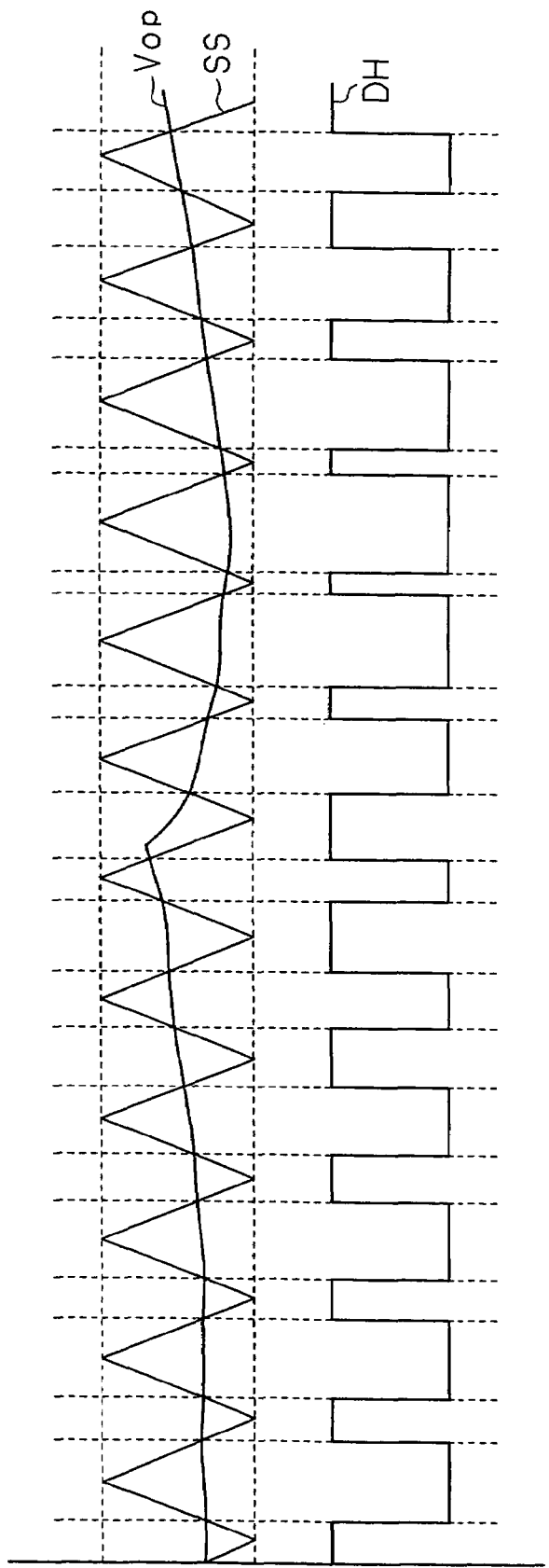
FIG. 2 is an operation waveform chart of the conventional DC-DC converter.
Figure 3:
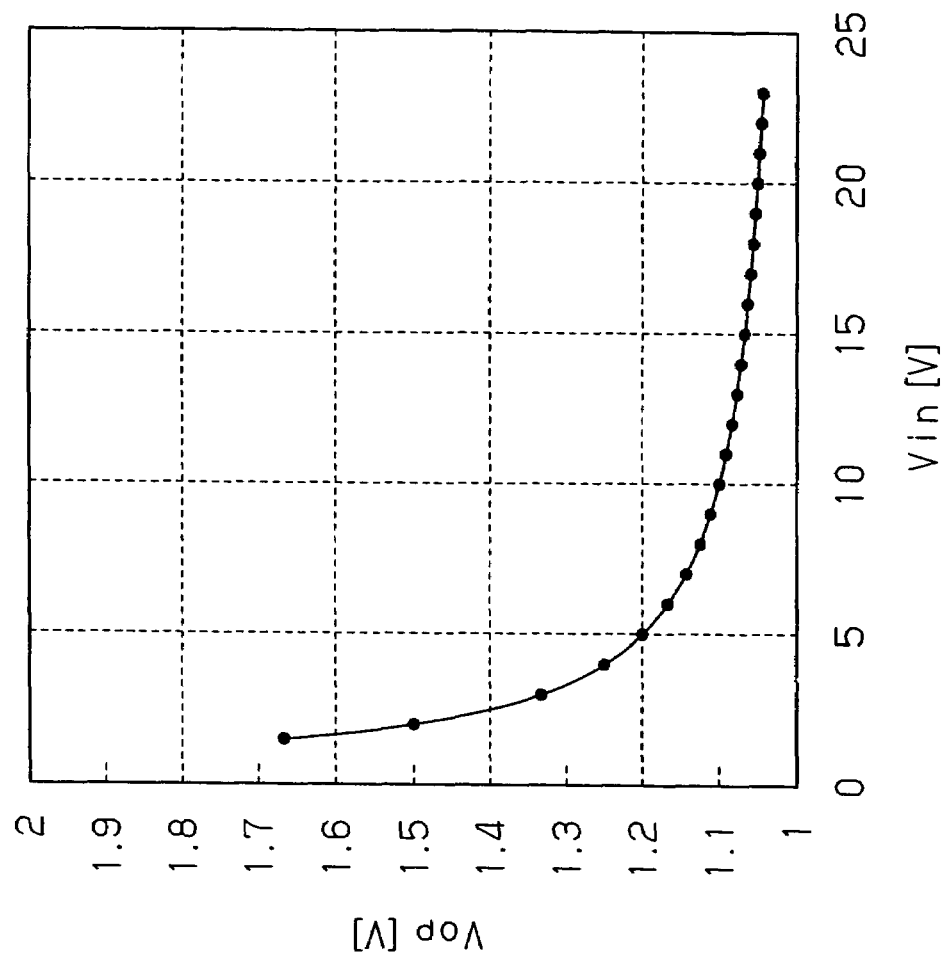
FIG. 3 is a diagram showing the behavior of error voltage with respect to input voltage.
Figure 4:
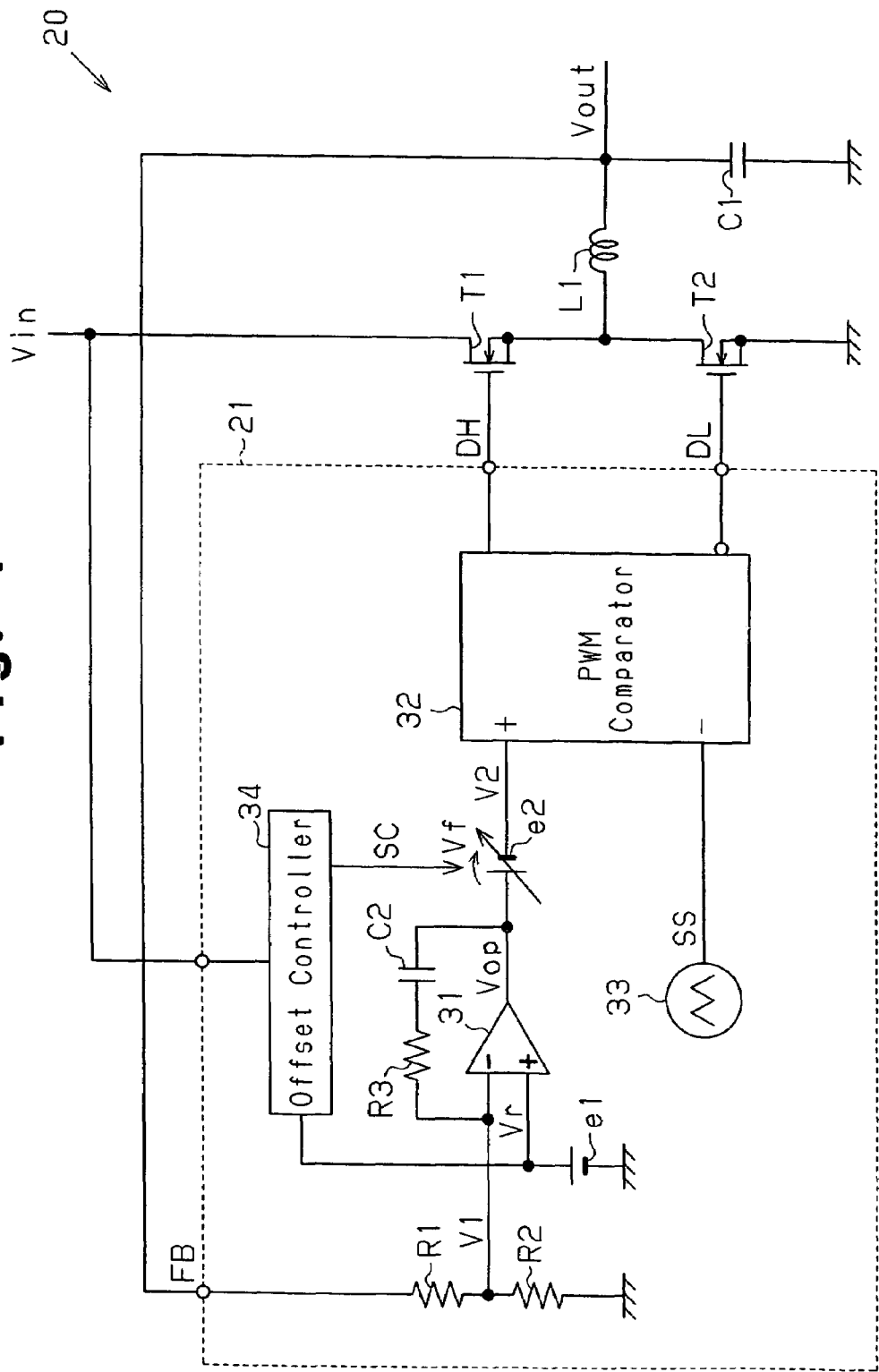
FIG. 4 is a block diagram of a DC-DC converter according to a first embodiment of the present invention.

The DC-DC converter 20 of the first embodiment is a voltage control mode type DC-DC converter. As shown in FIG. 4, the DC-DC converter 20 includes a control unit 21, a first output transistor T1, a second output transistor T2, a choke coil L1, and a smoothing capacitor C1.

The control unit 21 provides a drive signal DH to the gate of the output transistor T1 and provides a drive signal DL to the gate of the output transistor T2. The output transistor T1 is an N-channel MOS transistor and includes a drain supplied with the input voltage Vin and a source connected to the output transistor T2. The output transistor T2 is an N-channel MOS transistor and includes a source connected to a low potential power supply (ground) and a drain connected to the output transistor T1. The output transistors T1 and T2 are driven (activated and inactivated) in response to the drive signals DH and DL.

A node between the source of the output transistor T1 and the drain of the output transistor T2 is connected to the first terminal of the choke coil L1. The second terminal of the choke coil L1 is connected to an internal circuit (not shown) serving as a load.

The terminal at the load side of the choke coil L1 is connected to the first terminal of the smoothing capacitor C1 for smoothing the output voltage Vout. The second terminal at the smoothing capacitor C1 is connected to ground. The terminal at the load side of the choke coil L1 is connected to a terminal at the input side of the control unit 21. The voltage at the terminal on the load side of the choke coil L1, that is, the output voltage Vout is fed back to the input side of the control unit 21 as the feedback signal FB.

The input voltage Vin is supplied as power supply voltage to the control unit 21. The control unit 21 is operated by the power supply voltage.

The control unit 21 includes an error amplifier 31, a PWM (pulse width modulation) comparator 32, an oscillator 33, an offset controller 34, resistors R1, R2, R3, a feedback capacitor C2, a reference power supply e1, and a voltage source e2 serving as an offset circuit.

The feedback signal FB is provided to the first terminal of the input resistor R1, the second terminal of the input resistor R1 is connected to the first terminal of the ground resistor R2, and the second terminal of the ground resistor R2 is connected to ground. The input resistor R1 and the ground resistor R2 configure a voltage dividing circuit for generating a divided voltage (comparison voltage) V1 obtained by dividing the voltage of feedback signal FB. The comparison voltage V1 is input to the error amplifier 31.

The error amplifier 31 includes an inverting input terminal and a non-inverting input terminal. The comparison voltage V1, that is, the divided voltage of the output voltage Vout is input to the inverting input terminal, and the reference voltage Vr of the reference power supply e1 is input to the non-inverting input terminal. A circuit configured by connecting the feedback capacitor C2 and the feedback resistor R3 in series is connected between the output terminal and the inverting input terminal of the error amplifier 31 to prevent oscillation of the error amplifier 31. The feedback resistor R3 and the feedback capacitor C2 determine the gain (amplification factor) of the error amplifier 31 with the input resistor R1 and the ground resistor R2. The resistors R1 to R3 and the feedback capacitor C2 are formed on a substrate, on which the error amplifier 31 is also formed. Therefore, the error amplifier 31 operates as an amplifier having a fixed amplification factor.

The error amplifier 31 outputs the error signal Vop obtained by amplifying the voltage difference between the voltage of the reference power supply e1 and the comparison voltage V1 in accordance with the comparison result of the voltage of the reference power supply e1 and the comparison voltage V1 (divided voltage of output voltage Vout). In the first embodiment, the error signal Vop increases in accordance with the voltage difference if the comparison voltage V1 input to the non-inverting input terminal is lower than the reference voltage Vr input to the non-inverting input terminal. The error signal Vop decreases in accordance with the voltage difference if the comparison voltage V1 is higher than the reference voltage Vr.

The voltage source e2 is connected between the output terminal of the error amplifier 31 and the PWM comparator 32. The voltage source e2 outputs an offset signal V2 generated by superimposing an offset voltage Vf, which is a direct current, on the error signal Vop. The voltage source e2 changes the offset voltage Vf in accordance with the control signal SC. The positive terminal of the voltage source e2 is connected to the output terminal of the error amplifier 31, and the negative terminal of the voltage source e2 is connected to the PWM comparator 32. Therefore, the voltage source e2 adds a negative offset to the error signal Vop.

The offset signal V2 is provided to the PWM comparator 32. The PWM comparator 32 includes a non-inverting input terminal and an inverting input terminal. The offset signal V2 is input to the non-inverting input terminal, and the triangular wave signal SS generated by the oscillator 33 is input to the inverting input terminal. The oscillator 33 is oscillated and operated to generate the triangular wave signal SS having a constant frequency and a predetermined amplitude. For instance, the amplitude of the triangular wave signal SS is set to have a minimum voltage of 1.0 V, and a maximum voltage of 2.0 V.

The PWM comparator 32 compares the offset signal V2 and the triangular wave signal SS of the oscillator 33, and outputs complementary drive signals DH and DL having levels corresponding to the comparison result. Specifically, the PWM comparator 32 outputs the drive signal DH with an H level and the drive signal DL with an L level when the voltage of the offset signal V2 is higher than the voltage of the triangular wave signal SS, and outputs the drive signal DH with an L level and the drive signal DL with an H level when the voltage of the offset signal V2 is lower than the voltage of the triangular wave signal SS. The drive signal DH is provided to the output transistor T1, and the output transistor T1 operates in response to the drive signal DH. The drive signal DL is provided to the output transistor T2, and the output transistor T2 is activated and inactivated in response to the drive signal DL.

The offset controller 34 determines the comparison result, that is, the ratio of the input voltage Vin and the output voltage Vout of the DC-DC converter 20, and outputs the control signal SC in accordance with the ratio. Specifically, the reference voltage Vr and the input voltage Vin are input to the offset controller 34. The reference voltage Vr is a target voltage for keeping the output voltage Vout constant. The DC-DC converter 20 keeps the output voltage Vout at a substantially constant voltage by controlling the ON duty of the output transistors T1 and T2 so that the voltage V1 obtained by dividing the output voltage Vout coincides with the target voltage. Therefore, the reference voltage Vr corresponds to the output voltage Vout. The offset controller 34 calculates the ratio between the reference voltage Vr and the input voltage Vin.

The offset controller 34 generates the control signal SC based on the calculated ratio. The offset voltage Vf of the voltage source e2 is changed in accordance with the control signal SC. The voltage source e2 changes the offset voltage Vf in response to the control signal SC. Therefore, the voltage of the offset signal V2 has a voltage value that is offset with respect to direct current in accordance with the ratio of the input voltage Vin and the output voltage Vout to the error signal Vop. The PWM comparator 32 compares the voltage of the offset signal V2 and the voltage of the triangular wave signal SS to output the drive signals DH and DL having a pulse width corresponding to the comparison result. Therefore, the pulse width, that is, the duty of the drive signals DH and DL is changed in accordance with the ratio of the input voltage Vin and the output voltage Vout.

Specifically, the offset controller 34 outputs the control signal SC so as to generate the offset voltage Vf, which is superimposed on the error signal Vop output from the error amplifier 31 so that the voltage of the offset signal V2 becomes equal to a median voltage of the amplitude of the triangular wave signal SS (median voltage of the maximum voltage and the minimum voltage) when the input voltage Vin is two times greater than the output voltage Vout. As described above, the maximum voltage and the minimum voltage of the triangular wave signal SS are set to 2.0 V and 1.0 V, respectively. Therefore, the offset controller 34 generates the control signal SC so that the offset voltage Vf becomes 1.5 V.

In the same manner, the offset controller 34 generates the control signal SC so that the voltage of the offset signal V2 is $\frac{1}{3}$ of the amplitude of the triangular wave signal SS, or approximately 1.33 V, when the input voltage Vin is three times greater than the output voltage Vout. Similarly, the offset controller 34 generates the control signal SC so that the voltage of the offset signal V2 is $\frac{1}{4}$ of the amplitude of the triangular wave signal SS, or approximately 1.25 V, when the input voltage Vin is four times greater than the output voltage Vout.

Figure 5:
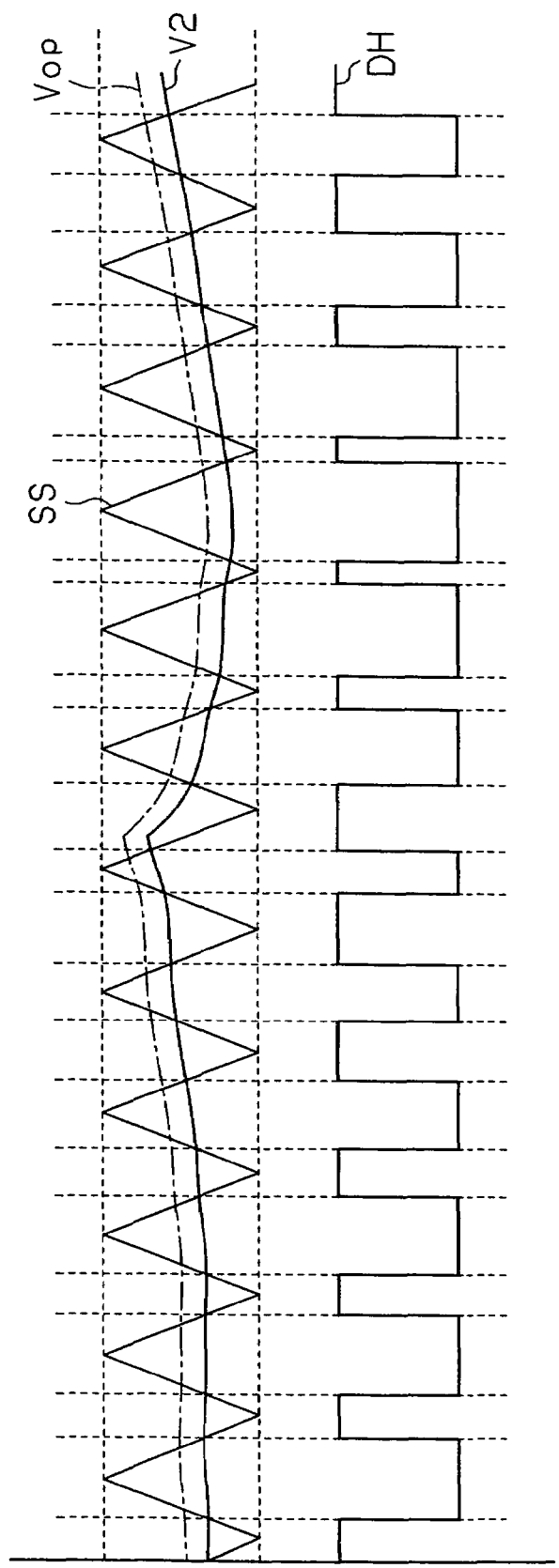
FIG. 5 is an operation waveform chart of the DC-DC converter.

Accordingly, the offset controller 34 changes the offset voltage Vf of the offset signal V2 with respect to the error signal Vop. That is, as shown in FIG. 5, the offset controller 34 offsets the error signal Vop, which is indicated by the broken line, to the offset signal V2, which is indicated by the solid line. The ON duty of the drive signal DH thus becomes a value based on the offset signal V2.

The offset signal V2 is a signal generated by superimposing the offset voltage Vf on the error signal Vop. Since the amplification factor of the error amplifier 31 is fixed, the amount of change in the offset signal V2 with respect to the fluctuation of the output voltage Vout becomes the same as the amount of change in the error signal Vop. Since the response of the control unit 21 with respect to the fluctuation of the output voltage Vout does not change, excessive response is prevented, and the output voltage Vout is stabilized at the same time even in a system having a different input voltage Vin. That is, the control property is prevented from varying between systems. In the prior art example, when the amplification factor of the error amplifier changes, the response to a change in output voltage Vout changes. Thus, the control property varies between systems.

Figure 6:
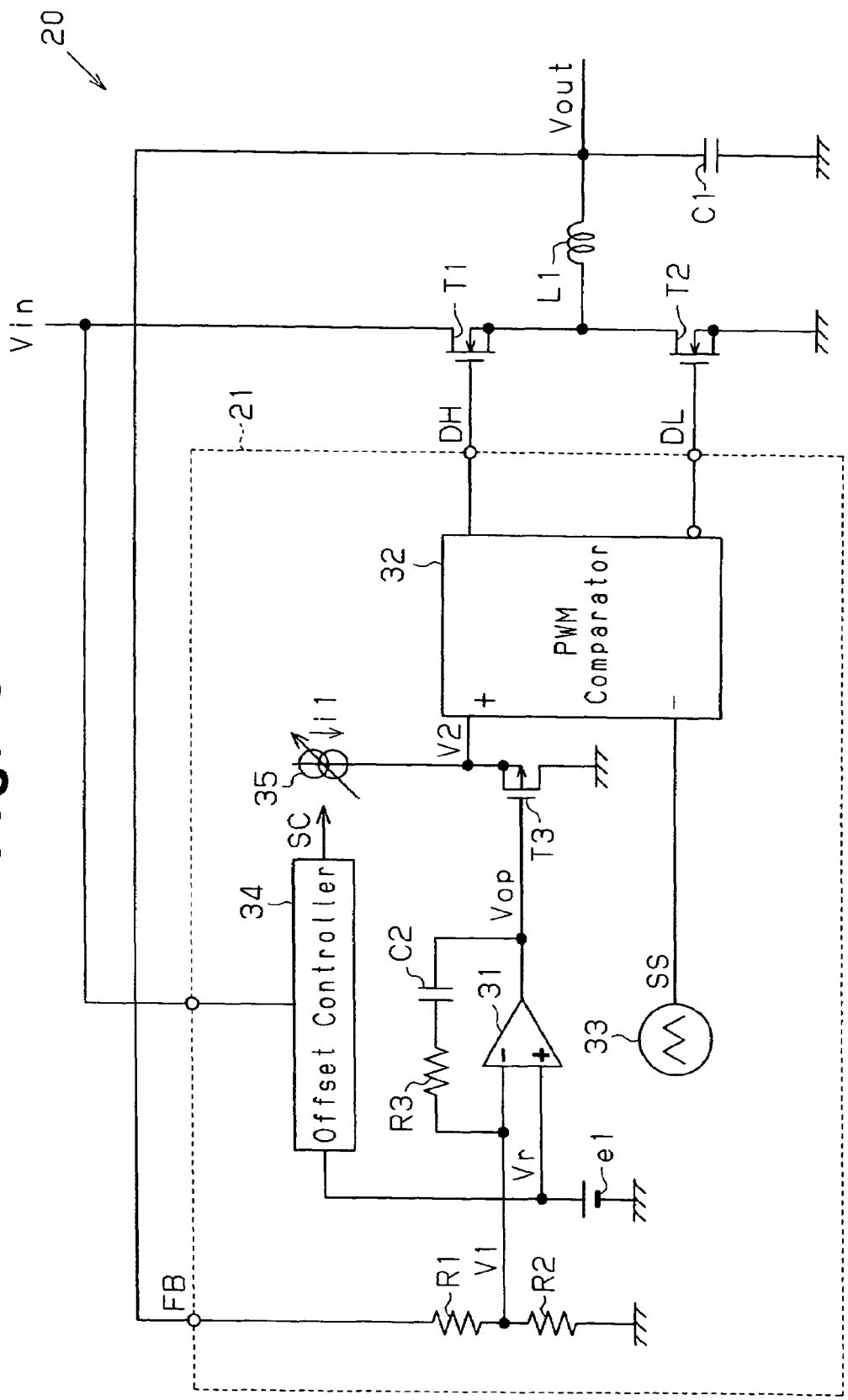
FIG. 6 is a block diagram of a modification of the DC-DC converter of FIG. 4.

FIG. 6 shows a modification of the DC-DC converter of FIG. 4. The voltage source e2 of FIG. 4 is replaced with a constant current source 35 and a transistor T3. The constant current source 35 changes the current i1 that flows in response to the control signal SC. The transistor T3 is a P-channel MOS transistor. The source is supplied with current i1, the drain is connected to the ground, and the gate is provided with the error signal Vop. In the voltage source e2, the transistor T3 has impedance that is in accordance with the voltage of the error signal Vop. Thus, the voltage between the source and the drain of the transistor T3, that is, the voltage at the node between the constant current source 35 and the transistor T3 is changed by the current i1 supplied from the constant current source 35, and the offset signal V2 having such voltage is provided to the PWM comparator 32. As one example, the impedance of the transistor T3 decreases as the voltage of the error signal Vop decreases. Further, the voltage between the source and the drain of the transistor T3 decreases, and the voltage of the offset signal V2 decreases. As another example, the impedance of the transistor T3 increases as the voltage of the error signal Vop increases. Further, the voltage between the source and the drain of the transistor T3 increases, and the voltage of the offset signal V2 increases. The voltage between the source and the drain of the transistor T3 is thus controlled in proportion to the voltage of the error signal Vop. Accordingly, the offset signal V2 is changed in the same manner as the error signal Vop.

Further, the voltage between the source and the drain of the transistor T3 is determined by the current i1 supplied from the constant current source 35. Thus, the amount of direct current of the offset signal V2, that is, the amount of offset is changed by changing the amount of current of the current i1.

Figure 7:
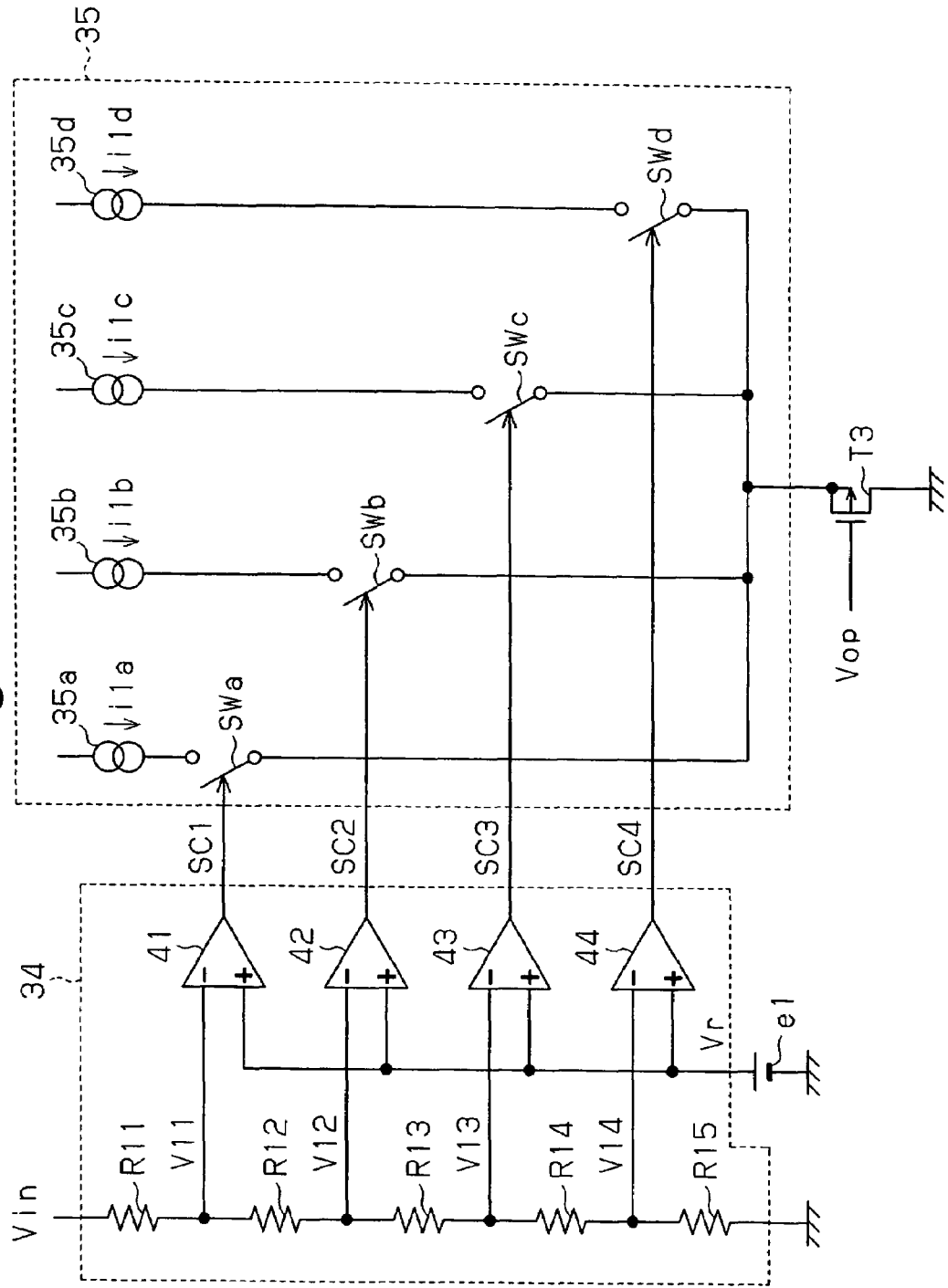
FIG. 7 is a circuit diagram of an offset controller and a constant current source of the first embodiment.

FIG. 7 is a circuit diagram showing one example of the offset controller 34 and the voltage source e2. The offset controller 34 includes a plurality of resistors R11 to R15 (five in FIG. 7) connected in series and four voltage comparators 41 to 44. Each of the voltages between the resistors R11 to R15 is supplied to the non-inverting input terminals of the voltage comparators. The reference voltage Vr is supplied to the non-inverting input terminal of each of the voltage comparators 41 to 44. The resistors R11 to R15 are connected in series between the input voltage Vin and the ground. Voltages V11 to V14 are generated by dividing the input voltage Vin in accordance with the resistance value of each resistor R11 to R15. Each voltage V11 to V14 changes in accordance with the input voltage Vin.

The voltage comparators 41 to 44 compare the corresponding voltage V11 to V14 with the reference voltage Vr to output control signals SC1 to SC4 in accordance with the comparison results, respectively. The voltages V11 to V14 change in accordance with the input voltage Vin. Therefore, the level of the control signals SC1 to SC4 changes in accordance with the input voltage Vin, and the control signals with an H level decrease as the input voltage Vin becomes higher.

The constant current source 35 includes four constant current sources 35a to 35d, and switches SWa to SWd each having a first terminal connected to the corresponding constant current source 35a to 35d. The node connected with the second terminals of the switches SWa to SWd is connected to the transistor T3. The switches SWa to SWd operate in response to the control signals SC1 to SC4. For instance, each switch SWa to SWd is activated in response to a signal with an H level and inactivated in response to a signal with an L level.

The level of the control signal SC1 to SC4 changes in accordance with the input voltage Vin, and the control signal with an H level decreases as the input voltage Vin becomes higher. Since the switches SWa to SWd are operated by the control signals SC1 to SC4, the number of switches that are activated decreases as the input voltage Vin becomes higher. Therefore, the constant current source 35 reduces the current supplied to the transistor T3 as the input voltage Vin becomes higher.

The operation of the DC-DC converter 20 will now be explained. In one example, the DC-DC converter 20 generates the output voltage Vout from the input voltage Vin supplied from the battery (not shown). The control unit 21 provides the gates of the output transistors T1 and T2 with the drive signals DH and DL having a duty corresponding to the comparison result of the reference voltage Vr and the divided voltage V1 obtained by dividing the output voltage Vout. The output voltage Vout increases by activating the output transistor T1 with the drive signal DH having an H level and inactivating the output transistor T2 with the drive signal DL having an L level. The output voltage Vout is smoothed by the smoothing capacitor C1. When the output transistor T1 is inactivated by the drive signal DH having an L level, the energy stored by the choke coil L1 is released. This reduces the energy stored in the choke coil L1 and decreases the output voltage Vout. Further, the drive signal DH is output with an H level and the output transistor T1 is activated when the divided voltage V1 obtained by voltage dividing the output voltage Vout with the resistors R1 and R2 becomes lower than the reference voltage Vr.

When the output voltage Vout decreases, the voltage of the error signal Vop increases, and the pulse width of the drive signal DH of H level increases. Further, the activation time of the output transistor T1 becomes long. When the output voltage Vout increases, the voltage of the error signal Vop decreases, and the pulse width of the drive signal DH of H level decreases. Further, the activation time of the output transistor T1 becomes short. Such operation controls the output transistors T1 and T2 so that the divided voltage V1 and the reference voltage Vr become equal to each other and keeps the output voltage Vout constant.

In another example, the DC-DC converter 20 is installed in an electronic device and an AC adapter is connected to the electronic device. The output voltage of the AC adapter is supplied to the internal circuit serving as a load. The power supply voltage supplied from the AC adapter is higher than the voltage of the battery. Therefore, the offset controller 34 calculates the offset voltage Vf corresponding to the ratio between the input voltage Vin and the output voltage Vout to generate the offset signal V2, which represents the offset voltage Vf. The voltage of the offset voltage V2 is lower than the voltage of the offset signal V2 in the above example. Therefore, in this example, the pulse width of the drive signal DH of the H level is less than in the above example. Thus, since the ON duty of the drive signal DH is small and the activation time of the output transistor T1 is short, the output voltage Vout of the same voltage is generated even if the input voltage Vin is increased.

The first embodiment has the advantages described below.

(1) The error amplifier 31 compares the divided voltage V1 obtained by dividing the output voltage Vout with a plurality of resistors R1 and R2 and the reference voltage Vr to generate the error signal Vop. The voltage source e2 generates the offset signal V2 obtained by offsetting the error signal Vop. The PWM comparator 32 compares the offset signal V2 and the triangular wave signal SS, generates the drive signals DH and DL for controlling the activation and inactivation of the first output transistor T1 and the second output transistor T2 at the duty corresponding to the comparison result. The offset controller 34 determines the ratio between the output voltage Vout and the input voltage Vin to control the offset voltage Vf of the voltage source e2 in accordance with the determination result. Therefore, the duty for controlling the activation and inactivation of the first output transistor T1 and the second transistor T2 is changed by the offset voltage Vf with respect to the error signal Vop, which offset amount is controlled by the ratio between the input voltage Vin and the output voltage Vout. Consequently, since the activation and inactivation of the first output transistor T1 and the second transistor T2 is controlled by the duty corresponding to the relationship between the input voltage Vin and the output voltage Vout, the present invention is applicable to input voltage Vin in a wide range by relatively changing the error signal Vop in accordance with the input voltage Vin to control the duty even if the input voltage Vin changes.

(2) Since the offset voltage Vf with respect to the error signal Vop is changed in accordance with the ratio between the input voltage Vin and the output voltage Vout, the amplification factor of the error amplifier 31 does not need to be changed, that is, the values of the resistors R1 to R3 and the feedback capacitor C2 that set the amplification factor of the error amplifier 31 do not need to be changed, and the design of the DC-DC converter is facilitated.

(3) Since the values of the resistors R1 to R3 and the feedback capacitor C2 that set the amplification factor of the error amplifier 31 does not need to be changed, these circuit components may be arranged on a single chip so as to reduce external components.

It should be apparent to those skilled in the art that the present invention may be embodied in many other specific forms without departing from the spirit or scope of the invention. Particularly, it should be understood that the present invention may be embodied in the following forms.

Figure 8:
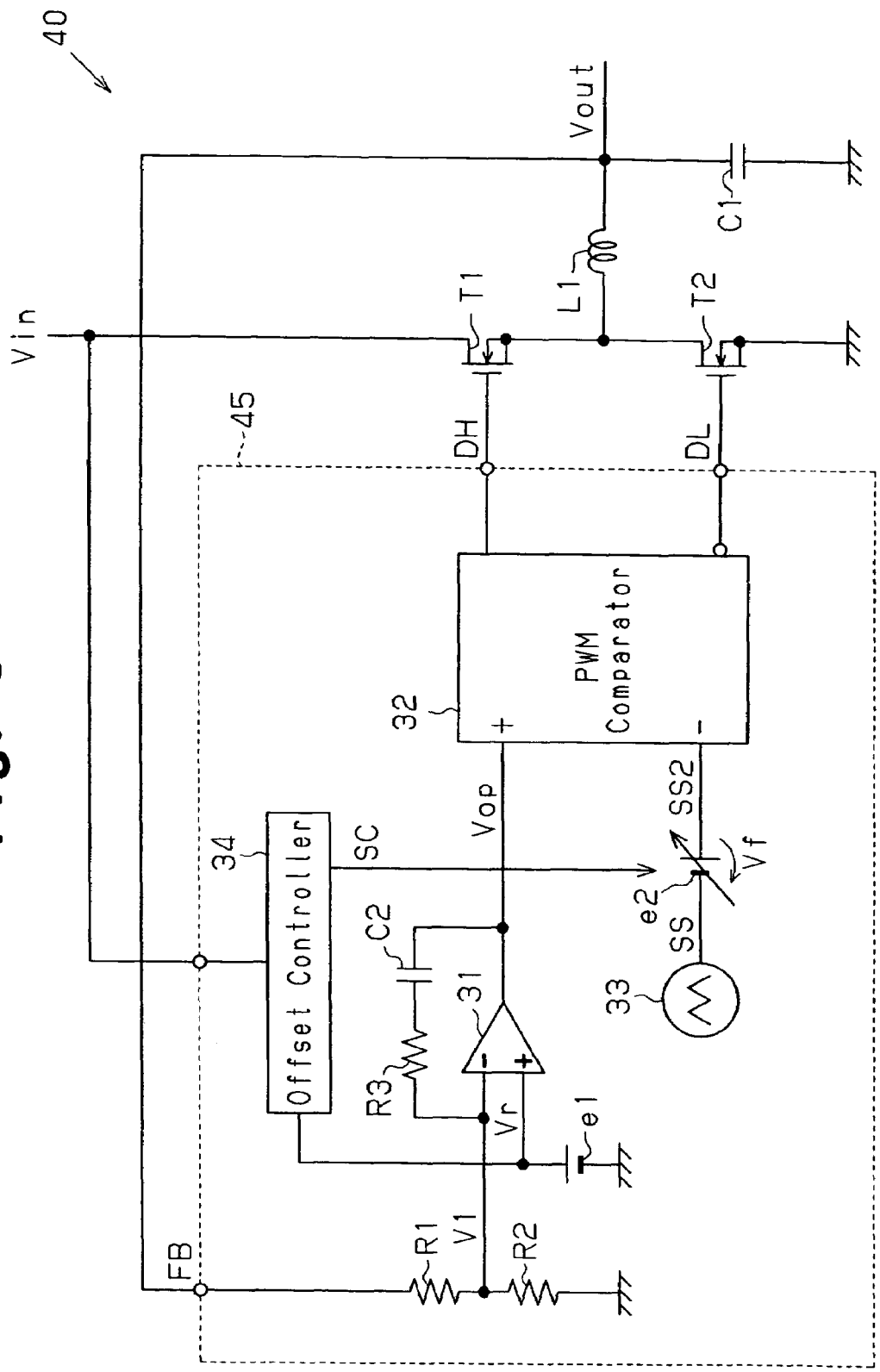
FIG. 8 is a block diagram of a DC-DC converter according to a second embodiment of the present invention.
Figure 9:
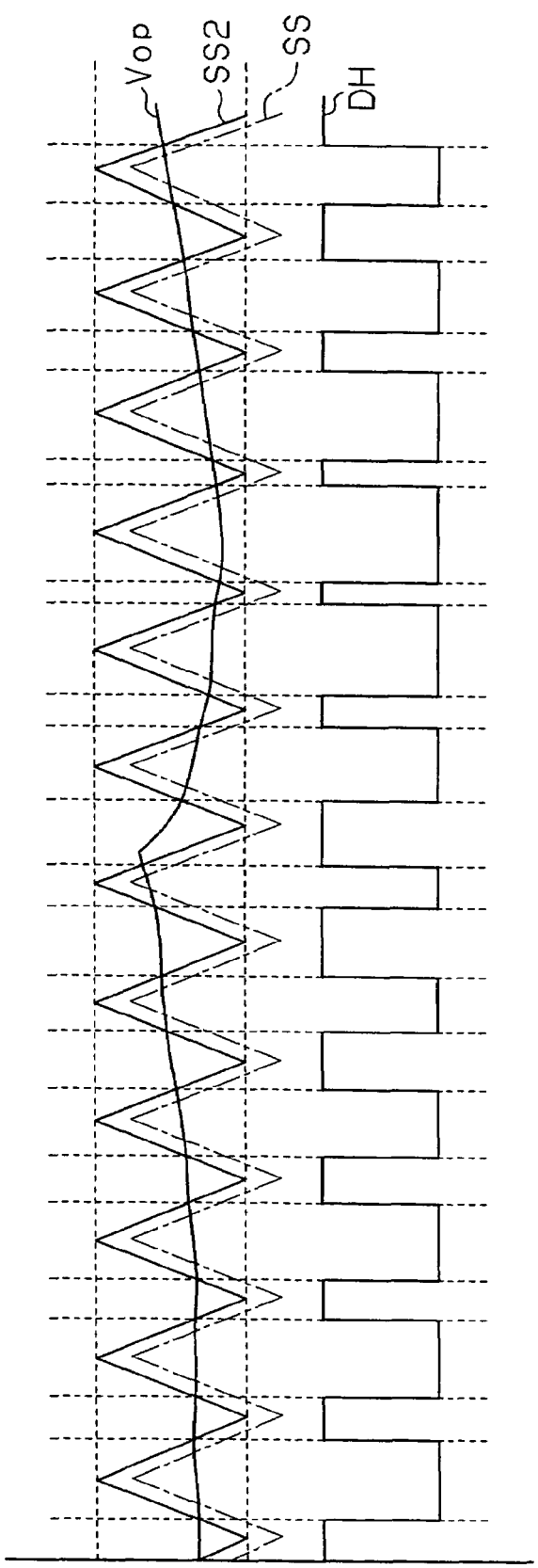
FIG. 9 is an operation waveform chart of another embodiment of a DC-DC converter.

The offset signal V2 is generated by adding the offset voltage Vf, which corresponds to the input voltage Vin and the output voltage Vout, to the error signal Vop. However, the offset voltage Vf may be added to the triangular wave signal SS. For instance, the voltage source e2 may be inserted and connected between the oscillator 33 and the PWM comparator 32 in a control unit 45 of a DC-DC converter 40, as shown in FIG. 8. The voltage source e2 outputs an offset signal SS2 generated by superimposing the offset voltage Vf, which is a direct current, on the triangular wave signal SS. The voltage source e2 changes the offset voltage Vf with the control signal SC. The negative terminal of the voltage source e2 is connected to the output terminal of the oscillator 33, and the positive terminal of the voltage source e2 is connected to the PWM comparator 32. Therefore, the voltage source e2 outputs the offset signal SS2 (indicated by solid line), which is generated by adding a positive offset to the triangular wave signal SS (indicated by broken line), as shown in FIG. 9. The same advantages as the first embodiment are obtained in this configuration. Further, the error signal Vop and the triangular wave signal SS may be offset.

The output transistors T1 and T2 may be P-channel MOS transistors. Further, the output transistor T1 may be a P-channel MOS transistor, and the output transistor T2 may be an N-channel MOS transistor. The level of the drive signals DH and DL must be changed in accordance with the different type of transistor. Further, a drive circuit for converting the output signal of the PWM comparator 32 to a level corresponding to the type of the transistor must be arranged between the gate of the transistor and the PWM comparator 32.

The offset controller 34 generates the control signal SC in accordance with the comparison result, that is, the ratio between the input voltage Vin and the output voltage Vout. However, the offset controller 34 may generate the control signal SC in accordance with a different comparison result, for example, the difference between the input voltage Vin and the output voltage Vout.

The present examples and embodiments are to be considered as illustrative and not restrictive, and the invention is not to be limited to the details given herein, but may be modified within the scope and equivalence of the appended claims.

What is claimed is:

1. A DC-DC converter for converting an input voltage to an output voltage, the DC-DC converter comprising:
   a first output transistor for receiving the input voltage;
   a second output transistor connected in series to the first output transistor; and
   a control unit for generating a drive signal that controls activation and inactivation of the first output transistor and the second transistor and for providing the first output transistor and the second transistor with the drive signal, the control unit changing duty of the drive signal in accordance with the output voltage, the control unit including:
   a plurality of resistors for generating a divided voltage from the output voltage;
   an error amplifier for comparing the divided voltage with a reference voltage to generate an error signal;
   an offset circuit for changing voltage of the error signal by an offset voltage that is in accordance with a control signal to generate an offset signal;
   a PWM comparator for comparing the offset signal with a triangular wave signal and generating the drive signal to have a duty that is in accordance with the comparison result; and
   an offset controller, connected to the offset circuit, for comparing the output voltage and the input voltage and generating the control signal in accordance with the comparison result.

2. A DC-DC converter for converting an input voltage to an output voltage, the DC-DC converter comprising:
   a first output transistor for receiving the input voltage;
   a second output transistor connected in series to the first output transistor; and
   a control unit for generating a drive signal that controls activation and inactivation of the first output transistor and the second transistor and for providing the first output transistor and the second transistor with the drive signal, the control unit changing duty of the drive signal in accordance with the output voltage, the control unit including:
   a plurality of resistors for generating a divided voltage from the output voltage;
   an error amplifier for comparing the divided voltage with a reference voltage to generate an error signal;

an offset circuit for changing a triangular wave signal by an offset voltage that is in accordance with a control signal to generate an offset signal;

a PWM comparator for comparing the error signal with the offset signal and generating the drive signal to have a duty that is in accordance with the comparison result; and an offset controller, connected to the offset circuit, for comparing the output voltage and the input voltage and generating the control signal in accordance with the comparison result.

3. A control unit for use in a DC-DC converter for converting an input voltage to an output voltage in which the control unit is for controlling the output voltage, wherein the DC-DC converter includes a first output transistor and a second output transistor that are connected in series, the control unit comprising:

a plurality of resistors for generating a divided voltage from the output voltage;

a plurality of resistors for generating a divided voltage from the output voltage;

an error amplifier for comparing the divided voltage with a reference voltage to generate an error signal;

an offset circuit for changing voltage of the error signal by an offset voltage that is in accordance with a control signal to generate an offset signal;

a PWM comparator for comparing the offset signal with a triangular wave signal and generating the drive signal to have a duty that is in accordance with the comparison result; and an offset controller, connected to the offset circuit, for comparing the output voltage and the input voltage and generating the control signal in accordance with the comparison result.

4. A control unit for use in a DC-DC converter for converting an input voltage to an output voltage in which the control unit is for controlling the output voltage, wherein the DC-DC converter includes a first output transistor and a second output transistor that are connected in series, the control unit comprising:

a plurality of resistors for generating a divided voltage from the output voltage;

an error amplifier for comparing the divided voltage with a reference voltage to generate an error signal;

an offset circuit for changing a triangular wave signal by an offset voltage that is in accordance with a control signal to generate an offset signal;

a PWM comparator for comparing the error signal with the offset signal and generating the drive signal to have a duty that is in accordance with the comparison result; and an offset controller, connected to the offset circuit, for comparing the output voltage and the input voltage and generating the control signal in accordance with the comparison result.

5. A method for controlling a DC-DC converter for converting an input voltage to an output voltage, the DC-DC converter including a first output transistor for receiving the input voltage and a second output transistor connected in series to the first output transistor, the method comprising:

generating a divided voltage from the output voltage with a plurality of resistors;

comparing the divided voltage with a reference voltage to generate an error signal with an error amplifier;

comparing the output voltage and the input voltage and generating a control signal in accordance with the comparison result with an offset controller;

changing voltage of the error signal by an offset voltage that is in accordance with the control signal to generate an offset signal with an offset circuit; and comparing the offset signal with a triangular wave signal, generating the drive signal to have a duty that is in accordance with the comparison result, and providing the drive signal to the first and second output transistors with a PWM comparator.

6. A method for controlling a DC-DC converter for converting an input voltage to an output voltage, the DC-DC converter including a first output transistor for receiving the input voltage and a second output transistor connected in series to the first output transistor, the method comprising:

generating a divided voltage from the output voltage with a plurality of resistors;

comparing the divided voltage with a reference voltage to generate an error signal with an error amplifier;

comparing the output voltage and the input voltage and generating a control signal in accordance with the comparison result with an offset controller;

changing a triangular wave signal by an offset voltage that is in accordance with the control signal to generate an offset signal with an offset circuit; and comparing the error signal with the offset signal, generating the drive signal to have a duty that is in accordance with the comparison result, and providing the drive signal to the first and second output transistors with a PWM comparator.

7. A DC-DC converter for converting an input voltage to an output voltage, the DC-DC converter comprising:

a first output transistor for receiving the input voltage;

a second output transistor connected in series to the first output transistor;

an offset controller for comparing the input voltage with the actual output voltage and generating a control signal for adjusting the actual output voltage in accordance with the comparison result to a desired output voltage; and a PWM comparator for providing the first output transistor and the second output transistor with a first drive signal and a second drive signal for driving the first and second output transistors, respectively, the drive signals each having a duty corrected in accordance with the control signal.

* * * * *

UNITED STATES PATENT AND TRADEMARK OFFICE
CERTIFICATE OF CORRECTION

| | | |
|---|---|---|
| PATENT NO. | : 7,279,870 B2 | Page 1 of 1 |
| APPLICATION NO. | : 11/342553 | |
| DATED | : October 9, 2007 | |
| INVENTOR(S) | : Morihito Hasegawa et al. | |

It is certified that error appears in the above-identified patent and that said Letters Patent is hereby corrected as shown below:

Title Page -

In Item (54) Title, and col.1, lines 1 and 2, please correct to read as follows:

-- (54) DC-DC CONVERTER AND METHOD FOR CONTROLLING DC-DC CONVERTER --.

Signed and Sealed this

Fifteenth Day of July, 2008

JON W. DUDAS
*Director of the United States Patent and Trademark Office*